US Patent Number: 4,632,324
Date of Patent: Dec. 30, 1986
Gutschmit

[54] STRAND STORING AND DELIVERING DEVICE

[75] Inventor: Alan Gutschmit, Troy, N.C.

[73] Assignee: Mayer & Cie. GmbH & Co., Albstadt, Fed. Rep. of Germany

[21] Appl. No.: 682,439

[22] Filed: Dec. 17, 1984

Related U.S. Application Data

[63] Continuation-in-part of Ser. No. 441,116, Nov. 12, 1982, Pat. No. 4,506,429.

[51] Int. Cl.$^4$ .................... B65H 51/20; B65H 51/24
[52] U.S. Cl. .................... 242/47.01; 24/38; 66/132 R; 242/47.12; 474/153; 474/202
[58] Field of Search ............ 242/47.01, 47.04, 47.05, 242/47.06, 47.07, 47.08, 47.09, 47.1, 47.11, 47.12, 47.13; 474/152, 153, 162, 164, 202, 204, 205; 24/34, 35, 38; 29/450, 235; 139/452; 66/132 R, 132 T

[56] References Cited

U.S. PATENT DOCUMENTS

| | | | |
|---|---|---|---|
| 406,106 | 7/1889 | Lyon | 24/38 |
| 752,512 | 2/1904 | Buckley | 24/38 X |
| 2,022,601 | 11/1935 | McDonald | 24/38 X |
| 2,433,446 | 12/1947 | Foster | 24/38 X |
| 2,724,974 | 11/1955 | Ayres | 474/205 X |
| 3,625,444 | 12/1971 | Hatay | 242/47.01 |
| 3,713,307 | 1/1973 | Muhlhausler | 242/47.01 X |
| 3,720,384 | 3/1973 | Rosen | 242/47.01 |
| 3,820,731 | 6/1974 | Rosen | 242/47.01 X |
| 3,908,921 | 9/1975 | Jacobsson | 242/47.01 |
| 3,957,217 | 5/1976 | Clemens | 242/47.01 |
| 4,004,438 | 1/1977 | Raisin | 242/47.01 X |
| 4,102,509 | 7/1978 | Paepke | 242/47.04 |
| 4,153,213 | 5/1979 | Jacobsson | 242/47.01 |
| 4,180,215 | 12/1979 | Nurk | 242/47.01 |
| 4,247,057 | 1/1981 | Jacobsson | 242/47.01 |
| 4,399,952 | 8/1983 | Schaub | 242/47.05 |
| 4,407,336 | 10/1983 | Steiner | 242/47.01 |
| 4,410,146 | 10/1983 | Van Hest | 242/47.01 |

FOREIGN PATENT DOCUMENTS

| | | | |
|---|---|---|---|
| 2723965 | 11/1978 | Fed. Rep. of Germany | 242/47.05 |
| 1113501 | 12/1955 | France | 474/205 |
| 4102 | of 1889 | United Kingdom | 474/153 |
| 13213 | of 1898 | United Kingdom | 474/153 |
| 1592647 | 7/1981 | United Kingdom | 24/38 |

Primary Examiner—Stanley N. Gilreath
Attorney, Agent, or Firm—Shefte, Pinckney & Sawyer

[57] ABSTRACT

A simplified strand storage and feeding device having a rotatable spool about which a traveling yarn is transiently wound while being fed to a textile machine, utilizes a noval driving arrangement for rotation of the spool, including a pulley operatively affixed to the spool and having plural radial teeth circumferentially spaced about one side of a belt receiving recess in the pulley and a driving belt having compatible edge notches meshing with the pulley teeth. The edge notched configuration of the belt provides positively timed driving of the device while also being spliceable by mechanical interconnection of separate belt ends, so that the belt may be of non-endless form for ease of installation and breaks therein may be easily repaired by splicing. A slidably movable yarn withdrawal guide eyelet is provided for withdrawing yarn from the spool either tangentially or generally axially therefrom for operation of the device in either a positive or demand feeding mode. Two forms of pulley and spool assemblies are disclosed which eliminate the use of a separate yarn winding displacement member and are resultantly simplified, compact and less expensive than conventional devices.

25 Claims, 7 Drawing Figures

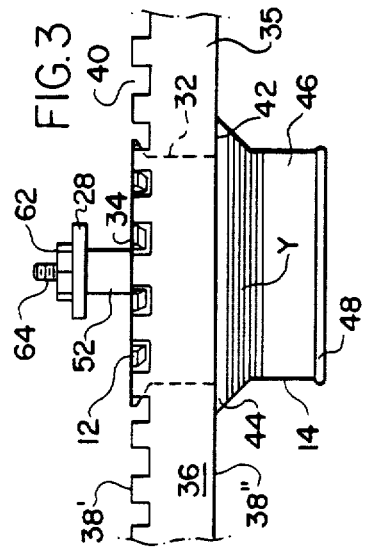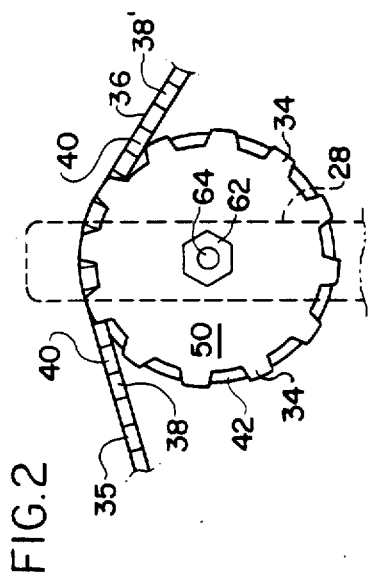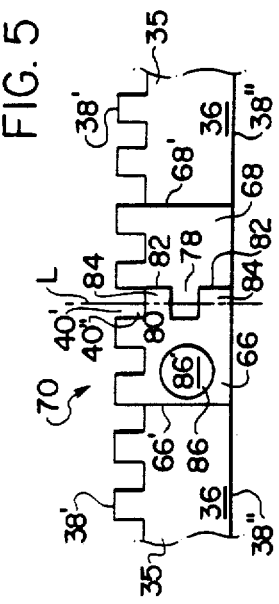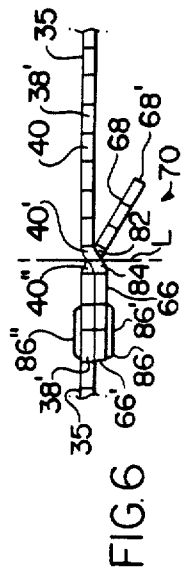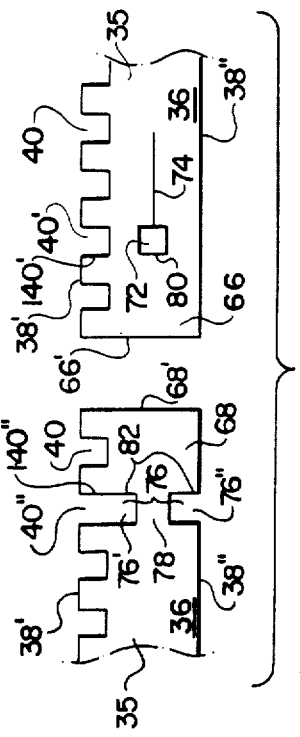

STRAND STORING AND DELIVERING DEVICE

CROSS-REFERENCE TO RELATED APPLICATIONS

This is a continuation-in-part of co-pending U.S. patent application Ser. No. 441,116, filed Nov. 12, 1982, now U.S. Pat. No. 4,506,429, entitled APPARATUS AND METHOD FOR PREPARING BELT END PORTIONS FOR SPLICED MECHANICAL INTERCONNECTION, BELT END PORTIONS PREPARED THEREBY AND SPLICED INTERCONNECTION FORMED THEREWITH.

BACKGROUND OF THE INVENTION

The present invention relates generally to devices for feeding a traveling strand of yarn or the like to a textile or like machine and more particularly relates to such devices of the type including a rotatable storage spool or drum arrangement adapted to receive several strand windings circumferentially thereabout for transient storage and delivery of a traveling strand by winding and unwinding thereof onto and off the spool or drum.

As used herein, the term "strand" is intended to generically define and indicate a continuous length material such as yarn, thread, filament, wire, rope, cable, tape or the like.

A relatively wide variety of spool or drum devices of the abovedescribed type are well known in the textile industry and are commonly referred to as "storage feeding devices." Representative examples of such storage feeding devices are disclosed in U.S. Pat. Nos. 3,606,975; 3,642,219; 3,648,939; 3,747,864; 3,796,384; 3,827,645; 3,928,987; 3,952,554; 4,106,713; and 4,138,866.

In basic construction, conventional storage feeding devices of the type of the above-listed patents essentially include a storage spool or drum for winding thereabout and unwinding therefrom the traveling strand to be stored and fed, a pulley or similar driving member fixedly interconnected coaxially with the spool or drum for integral driven rotation by the associated textile or like machine or by other means associated with the strand feeding arrangement therefor for effecting the on and off-winding of the strand, and a separate arrangement driven by the spool or drum for engaging the strand windings thereon to progressively displace them axially of the drum to the off-winding location. The storage spool or drum is usually constructed of axial rods or pins in a circumferentially spaced arrangement. The strand displacement arrangement may be of differing forms. In one general type of storage feeding device, the displacing arrangement includes a disc, ring, spoke-wheel or similar arrangement mounted on, extending through or otherwise associated with the rods or pins of the spool or drum at an inclination to its axis, the first nine above-listed patents exemplifying storage feeding devices of this type. One alternative form of strand displacing arrangement is illustrated in the last above-listed patent and includes a rotatable pin wheel arranged with its axis angularly oriented to the axis of the spool or drum and meshingly interdigitated therewith to be driven thereby.

Conventional storage feeding devices of the above-described type as illustrated in the listed patents are believed to be generally operable acceptably to perform their intended function. However, these devices are generally considered in the trade to be relatively expensive, due at least in part to precise parts manufacturing requirements and necessary assembly labor resulting from the engineering design of the operative association of the spool or drum and the strand displacing arrangement.

These storage feeding devices have found their widest application in controlling the feeding of yarn to textile circular knitting machines. Virtually without exception, these storage feeding devices are driven by a moving endless belt trained about the device's pulley member. In early storage feeding devices, the drive belting used was merely ordinary flatsided belting trained in frictional driving engagement with a compatible smooth circumferential belt engaging surface on the pulley member. However, as these storage feeding devices have been refined and improved to operate at the higher rotational speeds required to be compatible with conventional high speed circular knitting machines, problems have been encountered in that the required speed of movement of the drive belt often overcomes the frictional contact between the belt and the pulley resulting in unacceptable slippage therebetween which may cause yarn tension variations and even yarn breakage in some instances. To alleviate this problem, the pulley members and belting used with many present day storage feeding devices are constructed with appropriate mating surface configurations for positive timed engagement. For instance, the pulley members of many such storage feeding devices are provided with axially extending peripheral grooves to mesh with conventional timing belts of the type one side of which is formed with widthwise cogs. Other storage feeding devices employ pulley members having a peripheral circle of pins for meshing with timing belts which are of the basic flat belt type having holes centrally formed along the length of the belting to receive the pulley pins.

Some operational problems have been experienced with grooved-type timing belt and pulley arrangements in that fibrous lint and debris tend to collect in the belt and pulley grooves and to become progressively compacted therein over time by the meshing engagement between these components. Such accumulations may ultimately build to the point of preventing the desired meshing engagement between the belt and pulley. Therefore, periodic cleaning of the grooves of such belts and pulleys is required, which may be rather time consuming if a significant degree of accumulation has occurred and has become compacted.

Periodically, all such belts, both of the ordinary flat friction drive type and of the timing belt type, deteriorate and break requiring repair or replacement thereof. Most of each type of such belts typically are formed of a fabric-backed rubber material which is not inexpensive and, therefore, it is highly desirable to repair rather than to discard and replace broken belts. In uses of flat-type friction and timing belts, broken belts of these types are not ordinarily discarded but instead are conventionally repaired by splicing thereof through a process of grinding or shaving the belt ends, applying glue thereto, and joining the belt ends while applying heat thereto to bond the belt ends together. However, as will be understood, grooved type timing belts are not easily susceptible of spliced repair in this or any similar manner and, therefore, must be discarded when broken and replaced with a new belt. In addition to the apparent disadvantage of increased belt costs that result from this necessity of replacing such grooved timing belts, the replacement procedure requires a significant amount of labor and knitting machine down time in that, since yarn is fed to the machines from overhead, all yarn ends leading into the machine from overhead must be taken down to permit the endless replacement belt to be installed on the machine and then the yarn ends must be replaced in feeding position.

Moreover, the above-described conventional repair procedure for splicing flat belts has several operational and cost disadvantages. First, a relatively significant initial and ongoing investment of capital is required to be properly equipped to perform the splicing repair procedure in that special grinding and heating machines are required to perform the respective steps of shaving or grinding preparation of the belt ends and heating of the joined belt ends, both of which machines represent a relatively significant initial capital investment and further require periodic maintenance and repair in themselves, and a sufficient supply of appropriate glue is also required, which has a relatively limited shelf life. Additionally, as mentioned above, since yarn is fed to conventional circular knitting machines from overhead so that it is not possible to install a spliced belt on the machine without taking down all yarn ends being fed, it is characteristically necessary that at least the steps of gluing and bonding of the belt ends be carried out at the knitting machine with the belt in place in its operating position. As a result, replacement flat belts ordinarily are not prepared and inventoried in advance but are only prepared when needed and at the particular location required. As will be understood, the down time of machines experienced due to broken belts is at least the amount of time required to perform the splicing procedure and can be substantially greater if the belts of more than one machine break at the same time since it is normally not economically justifiable for most textile knitting mills to maintain more than one head bonding machine. Furthermore, because the conventional splicing procedure is relatively time-consuming and troublesome, it is often typical for mills to discard otherwise usable lengths of broken flat belts and to replace them with a new flat belt which requires only one splicing operation rather than splicing several shorter belt lengths.

As a result of these disadvantages some knitting mills have in recent times begun splicing broken flat friction belts by an old and well-known system of mechanical interconnection wherein a central opening is cut in one belt end with a longitudinal slit extending therefrom and notches are cut in opposite side edges of another belt end whereby the notched belt end may be inserted through the slit and central opening of the first belt end and the portion of the notched belt end between the notches positioned in the central opening to mechanically interconnect the two belt ends. As will be understood, this mechanical splicing procedure is entirely unsuitable for splicing either flat or grooved-type timing belts in that the spliced belt area would be reduced entirely incapable of the necessary ability for meshing engagement with the associated pulleys. However, as used with flat friction-type belting, this mechanical splicing procedure eliminates substantially all of the above-discussed disadvantages of the conventional glue and heat bonding procedure in that no costly special machinery or supplies are necessary and the preparation of the belt ends maybe performed both quickly and in advance whereby several small belt lengths may be inventoried for quick spliced interconnection at a machine immediately when needed to substantially reduce machine downtime to a minimum. However, certain disadvantages also exist presently with this mechanical splicing procedure in that, to date, this procedure has always been performed by hand in a relatively inexact but otherwise effectively operable manner. This latter problem has been substantially alleviated however by the invention disclosed in the aforementioned co-pending U.S. patent application Ser. No. 441,116, which provides a simple and inexpensive apparatus and method for preparing belt ends in a precise and exact manner for mechanical spliced interconnection of the above-described type.

It is also known to employ storage feeding devices in either a "positive" feeding mode wherein the strand is tangentially wound onto and off the spool or drum so that the rates of strand on and off winding are equivalent, or in a "demand" feeding mode wherein the strand is unwound from the spool or drum in a direction generally axially thereof so that such strand off-winding may occur at a rate independently of the rate of strand on-winding. Typically, conventional storage feeding devices are constructed to be operable in one or the other mode, examples of positive-type storage feeding devices being disclosed in the above-listed U.S. Pat. Nos. 3,827,645 and 4,106,713 and examples of demand-type storage feeding devices being disclosed in the above-listed U.S. Pat. Nos. 3,606,975; 3,642,219; 3,648,939; and 3,928,987. As will be appreciated, the limitation of such storage feeding devices to operation in only one mode significantly limits the flexibility of their use. Accordingly, storage feeding devices having adjustable strand-off winding guide arrangements have been proposed for facilitating selective alternative use of the devices in either a positive or a demand feeding mode, examples of such devices being disclosed in the above-listed U.S. Pat. Nos. 3,796,384 and 4,138,866.

SUMMARY OF THE INVENTION

It is accordingly an object of the present invention to provide an improved strand storage feeding device which substantially eliminates the foregoing disadvantages of the conventional storage feeding devices. More particularly, the present invention has as one of its objects the provision of a novel belt and pulley arrangement for timed positive driving of strand storage feeding devices and the like, which arrangement suffers substantially no lint accumulation problems as occur with the conventional belts described above and the belt of which is readily and easily susceptible of mechanical spliced interconnection in the manner of the invention of copending U.S. application Ser. No. 441,116. It is another object of the present invention to provide a simplified movable strand off-winding guide arrangement which facilitates operation of storage feeding devices in either a positive or a demand feeding mode. A further object of the present invention is the provision of alternate forms of strand storage feeding devices having simplified arrangements of the storage spool or drum and the associated pulley or driving member which eliminate the necessity of a separate strand displacing arrangement. Other objects of the present invention are disclosed and will appear hereinafter.

Briefly described, the present storage feeding device is adapted for transiently storing and delivering a traveling strand to a textile machine, e.g. a circular knitting machine, or the like and basically includes a strand storage member having a circumferential portion about and from which the strand may be wound and unwound a driving member operatively associated with the strand storage member for driving rotation thereof.

According to one feature of the present strand storage device, a driving arrangement including the driving member is provided for timed positive driving rotation of the strand storage member. The driving member is a pulley operatively associated with the strand storage member and the driving arrangement further includes a belt for training about a portion of the pulley for driving rotation thereof. The pulley includes an annular belt engaging surface and a plurality of radially extending teeth equally spaced circumferentially about the pulley adjacent one side of the belt engaging surface. The belt includes a plurality of notches formed along one edge thereof at equal spacings corresponding to the radial teeth and shaped to compatibly mesh with the teeth.

In the preferred embodiment, the belt has two opposite ends and a splice fixing the two ends to one another with the respective notches at each end in register with one another. The splice includes an opening in one belt end centrally of the transverse dimension thereof and a slit in such belt end extending longitudinally from the central opening away from such belt end. Transversely opposed openings are provided in the opposite transverse side edges of the other belt end and the two belt ends are mechanically interconnected with the other belt end inserted through the slit and the central opening of the one belt end and with the transverse extent of the other belt end between its side edge openings transversely within the central opening. The splice further includes an arrangement, preferably in the form of a rivet, supplementally affixing the one belt end at a location longitudinally outwardly from its central opening to the other belt end at a location longitudinally inwardly from its side edge openings.

According to another feature of the present invention, a first guide arrangement is provided adjacent a yarn receiving region of the circumferential portion of the strand storage member for feeding the strand generally tangentially thereto and a second guide arrangement is provided adjacent a yarn withdrawal region of the circumferential portion of the strand storage member for withdrawing the strands generally tangentially therefrom. The second guide arrangement is slidably movable generally axially relative to the strand storage member between a position radially adjacent the yarn withdrawal region for controlling withdrawal of the strand from the strand storage member at substantially the same traveling speed as the strand is fed thereto and a position spaced from the strand storage member at the axial end thereof most closely adjacent the yarn withdrawal region for withdrawal of the strand from the strand storage member at a rate independently of the traveling speed of the strand.

According to another feature of the present invention, alternate embodiments of the strand storage member are provided in respective arrangements with the pulley to achieve displacement of strand windings on the strand storage member from the strand receiving region to the strand withdrawal region without the necessity of a separate strand displacing member or arrangement.

In one embodiment, the strand storage member comprises a spool having a continuous generally smooth circular annular periphery forming the circumferential portion, the spool being affixed coaxially with the pulley for rotation therewith about a rotational axis. The circumferential portion is of a decreasing dimension, preferably tapered, radially inwardly with respect to the strand storage member from the strand receiving region to the strand withdrawal region. This decreasing dimension of the circumferential portion is effective to cause windings of the strand thereabout to progressively migrate from the strand receiving region to the strand withdrawal region upon rotation of the strand storage member.

According to the other embodiment, the pulley is provided with a plurality of generally radial engaging surfaces spaced circumferentially thereabout and a plurality of generally axial openings intermediate the radial engaging surfaces and the strand storage member has circumferentially spaced plural axial projections. The pulley and strand storage member are rotatably mounted independently of one another with the projections of the strand storage member extending respectively into the openings of the pulley arrangement for meshing engagement therewith so that rotation of the pulley arrangement effects driving of the strand storage member. The respective axes of the pulley and strand storage member are set at a relatively small angle to one another for engagement of the windings of the strand on the strand storage member in the vicinity of the pulley by the radial engaging surfaces in order to displace the strand windings axially away from the pulley.

The pulley preferably is a pulley wheel including plural teeth extending axially from the pulley wheel in a circular arrangement spaced circumferentially from one another concentrically about the axis of the wheel, the radial engaging surfaces being formed by the projecting ends of the teeth. The strand storage member is preferably a spool having a plurality of axially extending pins in a circular arrangement spaced circumferentially from one another concentrically about the axis of the spool forming the circumferential strand-receiving portion and the axial projections. The angle at which the axes of the pulley wheel and the spool are arranged relative to one another is approximately seven degrees.

BRIEF DESCRIPTION OF THE DRAWINGS

FIG. 2 is a top plan view thereof;

FIG. 3 is a front elevational view thereof;

FIG. 4 is a side elevational view of two mating end portions of the drive belt of the device of FIG. 1 in disassembled form prepared for mechanical spliced interconnection;

FIG. 5 is another side elevational view of the belt end portions of FIG. 4 in spliced assembly;

FIG. 6 is a top plan view of the spliced belt end portions of FIG. 5; and

DESCRIPTION OF THE PREFERRED EMBODIMENT

Figure 1:
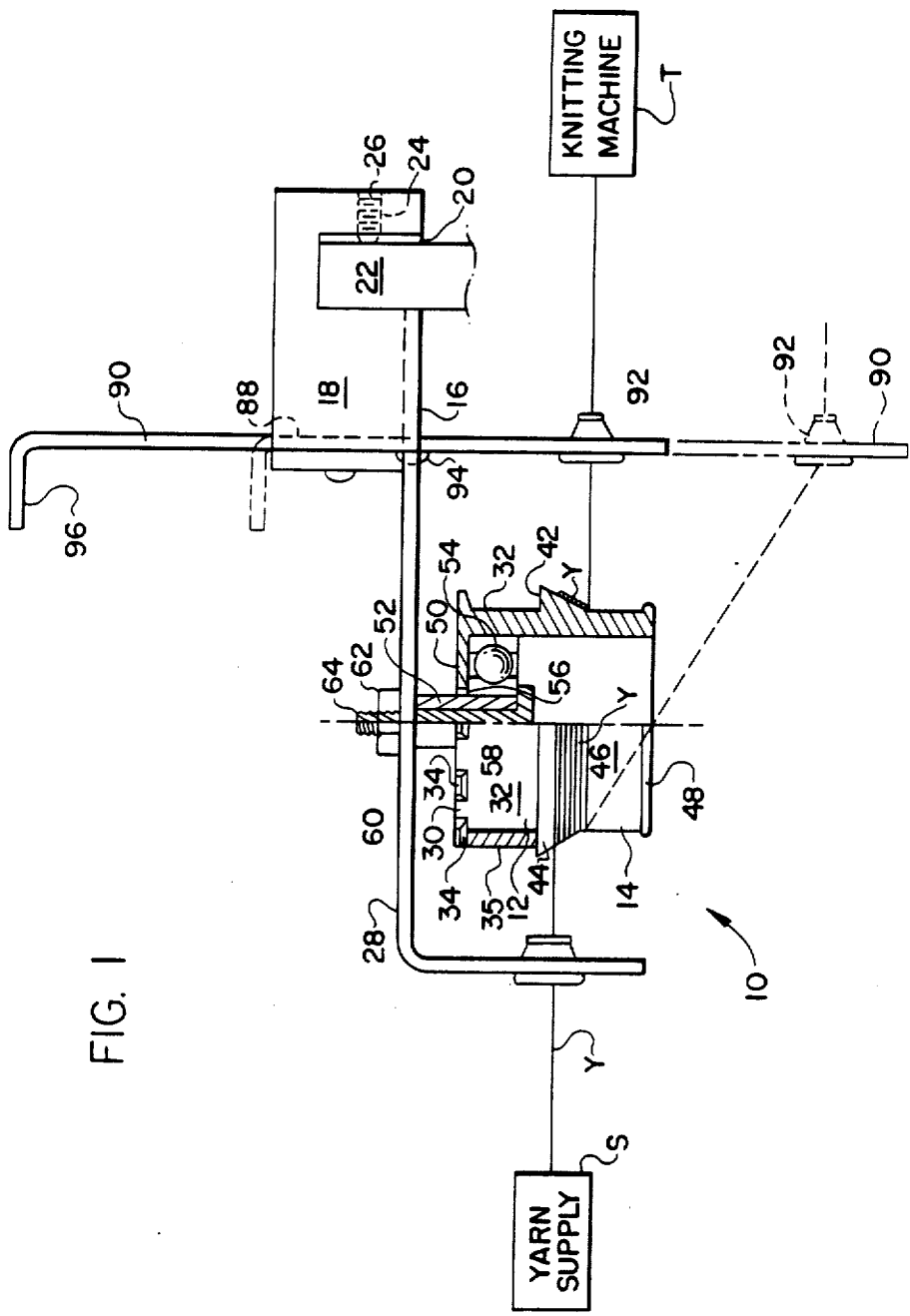
FIG. 1 is a side view of the strand storage device of the present invention partially in side elevation and partially in axial section.

Referring now to the accompanying drawing, the storage feeding device of the present invention is generally indicated at 10 and basically includes a pulley member 12 and a storage spool or drum member 14 integrally formed for unitary rotation and mounted on a support assembly 16.

The support assembly 16 includes a mounting block 18 having a downwardly open channel 20 formed therein adapted to receive an appropriate support member 22 such as a circular support ring or rail typically forming part of the yarn feeding and guiding arrangement of a conventional circular knitting machine. A threaded opening 24 is formed through the mounting block 18 to open into a channel 20 and receives an Allen screw 26 for selective clamping on and unclamping from the support member 22. An L-shaped mounting arm 28 is affixed to the underside of the mounting block 18 and extends outwardly therefrom.

The pulley member 12 includes a circular pulley wheel 30 having a circumferential peripheral recess 32 forming an annular surface adapted to receive a driving belt or tape 35 employed in the usual manner in the yarn feeding arrangement of the circular knitting machine. Preferably, the pulley wheel 30 is provided with a plurality of slightly tapered teeth 34 extending radially outwardly from the axially outward side of the recess 32 at equal circumferential spacings about the wheel 30. The driving belt 35 is formed of the conventional fabric-backed rubber or plastic composite construction with flat opposed parallel longitudinal sides 36 and parallel longitudinal edges 38 and has a plurality of substantially square or rectangular notches 40 formed along one edge 38' at equal spacings corresponding to the radial teeth 34 of the pulley wheel 30 to compatibly mesh with the teeth 34 when the belt 35 is received in and trained about the recess 32 in the pulley wheel 30. The pulley wheel 30 includes a radially outwardly extending lip 42 at the opposite axially inward side of the recess 32 for retaining the belt 35 trained in the recess 32 in meshing engagement of its notches 40 with the teeth 34 of the pulley wheel 30.

The storage spool member 14 is formed coaxially with the pulley member 12 and basically includes a first frusto-conical portion 44 and a second frusto-conical portion 46. The frusto-conical portion 44 extends from the lip 42 of the pulley member 12 axially away therefrom and at a radially inward taper of approximately thirty-five degrees (35°) relative to the common axis of the pulley and spool members 12,14. The frusto-conical portion 46 extends axially from the radially inward termination of the frusto-conical portion 44 at a very slight radially inward taper of as little as approximately one degree (1°) relative to the axis and terminates at an enlarged lip 48 spaced axially from the frusto-conical portion 44.

The pulley and spool members 12,14 are substantially hollow with the pulley wheel 30 having a radial end wall 50 at its axially outward end about which the teeth 34 are formed. The pulley and storage member unit is rotatably mounted on a tubular shaft 52 by a conventional ball bearing assembly 54 respectively affixed to the shaft 52 and fitted within the hollow interior area of the pulley wheel 30. The tubular shaft 52 extends through an opening 58 in the end wall 50 of the pulley wheel 30 and is affixed abuttingly to the mounting arm 28 of the support arrangement 16 by a bolt 58 which extends axially through the tubular shaft 52 and projects therefrom through a compatible opening 60 in the mounting arm 28 and is secured thereto by a nut 62 threadedly engaged on the threaded projecting end 64 of the bolt 58 on the opposite side of the mounting arm 28.

According to a unique feature of the present invention, the belt 35 is non-endless but instead has two opposite ends 66,68 which are mechanically interconnected by a splice 70, all as best seen in FIGS. 4–6. Each belt end portion 66,68 is squared at its end to provide an end edge 66',68' substantially perpendicularly to the longitudinal extent of the respective belt end portion 66,68. The belt end portion 66 has an opening 72 formed therein at a relatively small spacing from the end edge 66' and substantially centrally of the widthwise transverse extent of the belt and portion 66 between the unnotched longitudinal edge 38" and the notch 40'. The central opening 72 preferably is substantially square in shape and has a substantially straight linear side 80 at the location of the opening 72 most closely adjacent the end edge 66' and extending substantially parallel thereto. For purposes hereinafter explained, the central opening 72 is located longitudinally on the belt end portion 66 substantially intermediate two successive notches 40' therein but with the end-most transverse side 80 of the opening 72 formed more closely to the end edge 66' than the end facing transverse side 140' of the end-most notch 40' by a dimension W substantially equal to the thickness of the belt 35. A substantially linear slit 74 is also formed in the belt end portion 66 extending longitudinally thereof from the central opening 72 away from the end edge 66'. The belt end portion 68 has two openings 76 formed therein in transverse opposition to one another at a small spacing from the end edge at the location of one notch 40". The transverse openings 76 preferably are also substantially square in shape and have substantially straight linear sides 82 at the locations of the openings 76 most closely adjacent the end edge 68' and extending substantially parallel thereto. One opening 76' is formed at the notch 40" to deepen it with at least the endmost side 82 of the opening 76' in alignment with the endmost side 140" of the notch 40'. The other opening 76" is formed in the other longitudinal edge 38" directly transversely opposite the notch 40" and the opening 76' with the endmost side 82 of the opening 76" in alignment with the side 82 of the opening 76' and the side 140" of the notch 40". The central opening 72 in the belt end portion 66 is of a dimension transversely thereof at least, and preferably the same as, approximately one-third of the transverse dimension of the belt end portion 66 between the unnotched longitudinal side edge 38" and the notches 40 in the notched longitudinal side edge 38' and each side edge opening 76 in the belt end portion 68 is of a selected transverse dimension, also preferably approximately one-third of such transverse dimension of the belt end portion 68, such that the remaining transverse extent of the belt end portion 68 between the openings 76, indicated at 78, is of substantially the same transverse dimension as the central opening 72 in the belt end portion 66. The longitudinal slit 74 and the central opening 72 in the belt end portion 66 are of a combined dimension longitudinally thereof at least slightly greater than the widthwise transverse dimension of the belt end portion 68.

It will therefore be understood that the belt end portions 66,68 may be mechanically interconnected by orienting the belt end portion 68 in a disposition with the transverse widthwise extent of its end edge 68' aligned with the longitudinal extent of the slit 74 and central opening 72 of the belt end portion 66, inserting the belt end portion 68 through the slit 76 and central opening 72 to dispose the transverse portion 78 of the belt end portion 68 in the slit 76, and sliding the transverse portion 78 into the central opening 72 of the belt end portion 66 and positioning the transverse portion 78 transversely therein. The transverse portion 78, being of approximately the same dimension as the central opening 72, thusly fits snugly therein and as will be understood, when the belt end portions 66,68 as so assembled are pulled taut as illustrated in FIGS. 5 and 6, the straight sides 80,82 of the openings 72,76 are drawn toward alignment with one another to bring the respective belt end portions 66,68 into secure engagement along an area of substantially continuous engagement extending transversely of each thereof, indicated at line L, with the straight side 80 of the opening 72 of the belt end portion 66 engaged in contact with the transverse portion 78 of the belt end portion 68 and with the straight sides 82 of the openings 76 of the belt end portion 68 engaged in contact with the portions 84 of the belt end portion 66 transversely outwardly of the central opening 72 thereof. In this manner, the mechanical interconnection thusly provided between the belt end portions 66,68 is substantially as strong as the more conventional glue-and-heat-bonded splices described hereinabove and leaves the rearward sides of the belt end portions 66,68 at the location of interconnection sufficiently smooth for satisfactory operation in driving positive yarn feed devices.

Furthermore, the particular described positional relationship of the opening 72 and its straight side 80 relative to the endmost notch 40' and its side 140', and the particular described positional relationship of the openings 76 and their straight sides 82 relative to the notch 40" and its side 140", cause the notches 40 of the belt end portions 66,68 to come into substantially exact register with one another in the overlapping condition of the belt end portions 66,68 when mechanically interconnected to form the splice 70 as above-described, whereby the notches 40 in the region of the splice 70 function equally well for meshing engagement with the teeth 34 of the pulley wheel 30. It should be noted that the thickness of the particular belting material utilized in any belt made according to the present invention will determine the extent to which the straight sides 80,82 of the openings 72,76 may be drawn toward alignment with each other when mechanically interconnected to form a splice 70 according to this invention. More specifically, the belt thickness W will prevent the respective sides 80,82 of the openings 72,76 from coming into exact alignment in the assembled splice and will result in such sides 80,82 being spaced from one another in the assembled splice 70 by the same dimension W as the belt thickness. Therefore, as above-described, due compensation is made for the belt thickness by locating the central opening 72 with its endmost side 80 more closely adjacent the end edge 66' than the end facing side 140' of the endmost adjacent notch 40' by the thickness W of the belt 35. Thus, in the assembled splice 70, the endmost notch 40' of the belt end portion 66 comes into exact register with the notch 40" of the belt end portion 68 thereby insuring proper register of all the notches 40 of the belt end portions 66,68 in the assembled splice 70.

It is preferred that a supplemental affixation arrangement be utilized in the splice 70 to maintain the belt end portions 66,68 in their relative orientation in the splice 70 when interconnected as above-described. For this purpose, an ordinary metal rivet 86 is placed through appropriate openings 87 punched in the belt end portions 66,68 in the assembled splice 70 to extend through and permanently join the region of the belt end portion 66 longitudinally outwardly of its central opening 72 between it and the end edge 66' and the adjacent region of the belt end portion 68 longitudinally inwardly of its transverse openings 76. In this manner, the rivet 86 securely retains the belt end portions 66,68 at such regions thereof in parallel side-by-side abutment and insures particularly that the respective notches 40 in the belt end portions 66,68 are retained in proper, precise register with one another for proper meshing engagement with the teeth 34 of the pulley wheel 30. Furthermore, the rivet 86 prevents undue stress being placed on the splice 70, particularly the transverse portion 78 of the belt end portion 68, to avoid breakage of the belt 35 at the splice 70. In placing the rivet 86 in the belt end portions 66,68, it is preferred that the head 86' of the rivet 86 be abutted against the side 36 of the belt end portion 66 facing away from the belt portion 68 with the body of the rivet 86 extending through the belt end portions 66,68 to project from the side 36 of the belt end portions 86 facing away from the belt end portions 66 and to be flattened as at 86" in usual manner substantially flush against such side 36 of the belt end portion 68. In this manner, the flattened rivet portion 86" is disposed on the side of the splice 70 to be in driving contact with the recess 32 of the pulley wheel 30 in operation and therefore presents no impediment to the maintenance of proper meshing engagement of the belt notches 40 with the pulley teeth 34.

The preparation of the belt end portions 66,68 with their respective squared end edges 68',68' and their respective openings 72,76 and slit 74 and an apparatus and method for performing such preparation of the belt end portions 66,68 are disclosed in the aforementioned copending U.S. patent application Ser. No. 441,116, the disclosure of which is incorporated herein by reference and to which reference may be had for a complete specification and description of such apparatus and belt preparation. Briefly summarized, the apparatus preferably utilized is a punch press of conventional type adapted to form square openings and being provided with an appropriate jig for punching the openings 72,76 at the precise desired locations, as well as a jig for initially cutting the belt end edges 66',68' and for cutting the slit 74.

A linear slot 88 is formed through the mounting block 18 and the mounting arm 28 parallel to the axis of the pulley shaft 52 and receives a linear bar 90 for sliding movement within the slot 88. A plastic yarn guide eyelet 92 is fitted in an opening in the downward end of the bar 90. An enlarged button 94 is formed on the bar 90 at a slight spacing above the guide eyelet 92 for engagement with the mounting block 18 to restrict the upward movement of the bar 90 to an upward position at which the guide eyelet 92 is disposed radially adjacent the frusto-conical portion 46 of the spool member 14. Similarly, the upwardly projecting end of the bar 90 is bent 90 degrees to form a tab portion 96 adapted to restrict the downward movement of the bar 90 to a position at which the yarn guide eyelet 92 is spaced axially below the spool member 14. Another yarn guide eyelet 98 is fitted in an opening in the downwardly projecting end of the mounting arm 28 radially adjacent the frusto-conical portion 44 of the spool member 14.

The operation of the strand storage device 10 will thus be understood. In a typical embodiment in association with a textile machine such as a circular knitting machine, the device 10 is mounted in a disposition intermediately of a yarn supply, indicated only representatively at S, and the knitting or other textile machine, also indicated only representatively at T, and is oriented with its yarn guide eyelet 98 positioned to receive the yarn from the supply S in its path of travel to the textile machine T and with its guide eyelet 92 positioned to direct the traveling yarn to the textile machine T after leaving the device 10. As will be understood, a conventional multi-feed circular knitting machine will employ a respective yarn supply for each knitting station whereby a respective plurality of the devices 10 will be employed. The yarn Y is directed through the guide eyelet 98, extends therefrom tangentially to and is wound several times circumferentially about the spool member 14, and is withdrawn tangentially from the spool member 14 and directed through the yarn guide eyelet 92. As will be understood, the ongoing operation of the textile machine T creates an ongoing requirement for additional yarn and, for this purpose, the driving belt 35 is appropriately trained about the recess 32 and in proper meshing engagement with the teeth 34 of the pulley wheel 30 of each device 10 being employed and the belt 35 is driven from the textile machine T synchronously therewith in the same conventional manner as the conventional belts described hereinabove are driven, but utilizing a drive sprocket or pulley (not shown) similar to the pulley wheel 30 to be compatible with the notched configuration of the belt 35. Thus the pulley wheel 30 and the spool member 14 of each device 10 are unitarily rotated synchronously with the machine T, whereby the yarn Y is caused to travel in a longitudinal path from the supply S to the textile machine T during which it is transiently stored wrappingly about the spool arrangement 14. As the traveling yarn Y passes through the guide eyelet 98, it is tangentially placed initially onto the frusto-conical portion 44 of the spool member 14. As rotation of the pulley wheel 30 continues and in turn rotatably drives the spool member 14, the yarn Y begins to wrap about the frusto-conical portion 44 but, due to the relatively significant decreasing radial taper of the periphery of the frusto-conical portion 44 toward the frusto-conical portion 46 of the spool member 14 and due to the tension existing in the yarn Y, the yarn Y is deflected axially along the frusto-conical portion 44 to the smaller diameter frusto-conical portion 46 and is wrapped thereabout. The wrapping of the yarn Y thereafter naturally migrates progressively axially along the frusto-conical portion 46 further away from the frusto-conical portion 44 under the pushing effect created by the deflection of the following length of the yarn Y by the frusto-conical portion 44 to and under the effect of the slight taper of the frusto-conical portion 46. This manner of yarn wrapping deflection and migration occurs progressively as the yarn Y is continuously fed through the guide eyelet 98 and wrapped about the spool member as the rotation of the pulley and spool member unit continues and thereby produces a progressive axial movement of all yarn windings along the frusto-conical portion 46. In this manner, a single layer of windings of the yarn Y is provided about the spool member 14 with the yarn Y being withdrawn through the guide eyelet 92 from a region of the frusto-conical portion 46 of the spool member 14 spaced axially from the pulley wheel 30.

In an embodiment requiring a positive feeding of the yarn Y as hereinabove defined, the bar 90 is disposed in its uppermost position shown in full lines in FIG. 1 whereby the yarn Y is wound onto and unwound from the spool member 14 in tangential directions such that the yarn Y must be withdrawn through the guide eyelet 92 at the same longitudinal traveling speed at which it enters the guide eyelet 98 and is placed about the spool member 14. As those skilled in the art will understand, the operation of the device 10 in such a positive feeding mode is best adapted for feeding operation to textile machines having a substantially constant, unvarying yarn length requirement per unit time. On the other hand, in an embodiment requiring a demand type of yarn feeding as hereinabove defined, the bar 90 is disposed in its downwardmost position shown in broken lines in FIG. 1 such that yarn Y can be withdrawn through the guide eyelet 92 from the spool member 14 so that the rate of yarn withdrawal from the spool member 14 is independent of and can be different from the rate at which the yarn Y is fed to and wound about the spool member 14. Those skilled in the art will recognize that the operation of the device 10 in such a demand mode will be required with textile machines having an intermittently varying yarn length requirement per unit time.

Throughout the yarn on and off-winding rotation of the pulley and spool member unit, the driving belt 35 maintains a positive timed transmission of rotational movement from the driving sprocket or pulley associated with the machine T to the pulley and spool member unit by virtue of the intermeshing engagement between the belt notches 40 and the pulley teeth 34. As will be understood, this positive manner of driving rotation of the devices 10 substantially prevents any possible slippage of the belt 35 about the pulley wheel 30 thereby avoiding the creation of yarn tension variations or possible yarn breakage.

Advantageously, the strand storage device 10 of the present invention operates comparably with and as effectively as conventional storage feeding devices of the type above-described, but is of a substantially simpler construction requiring fewer manufactured parts and requiring correspondingly less labor time per unit for manufacturing assembly. Thus, the present device 10 is considerably less expensive than such conventional devices. Furthermore, the device 10 does not include electrical circuitry and electrical functions as are ordinarily provided in the above-described conventional devices and does not include its own yarn breakage detectors or stop motions. Instead, for simplicity, the device 10, due to its compactness, is adapted for ready mounting to many different types of supporting framework so as to facilitate its utilization in conjunction with existing stop motions and electrical circuitry on conventional textile machines, thereby even further reducing the cost of the device 10 and making it readily adapted for retrofitting to existing textile knitting machines and the like. The sliding bar 90 enables the use of the device 10 in either a positive or demand feeding mode which provides substantial versatility in the employment of the device 10. Additionally, the sliding capability of the bar 90 facilitates easy set-up of the associated textile machine when its basic mode of operation is being changed by permitting the operation of the device 10 preliminarily in a demand feeding mode until the machine set-up is completed, after which the selective alteration of the machine gearing may be completed to bring the driving operation of the machine and of the pulley wheel 30 into synchronization for normal operation of the device 10 in its intended positive or demand feeding mode.

The novel arrangement of the driving belt 35 and the pulley wheel 30 of the present invention provide even more significant advantages over the conventional rotational driving arrangements of conventional strand storage devices. Most importantly, the present drive belt 35 provides the two-fold advantages of serving as a positive-drive timing belt when in use and being readily capable of extremely simple and easy spliced installation and repair without costly or complex special machinery or equipment. In conventional belt drive arrangements for textile knitting machines and like equipment, these advantages have heretofore been considered mutually exclusive and unattainable in any single belt drive arrangement. Substantially all known conventional belts are endless and therefore are not initially installed by splicing in any event. As indicated above, flat friction-type non-timing belts have utilized in the past handmade mechanical repair splices and are now spliced mechanically in a more precise manner according to the invention of the aforementioned U.S. application Ser. No. 441,116, but such belts are incapable of positively timed driving operation. On the other hand, pin-type timing belts may be spliced by the complicated, time consuming and expensive grinding, gluing and bonding procedure described above, which many people find entirely unsatisfactory. Grooved-type timing belts cannot be spliced by any readily usable commercial repair procedure.

Since the present drive belt 35 is non-endless in contrast to all such conventional drive belts, the belt 35 can be easily installed on textile knitting machines without taking down any yarn ends or otherwise interfering with the yarn feeding arrangement, by simply extending the belt 35 in unspliced condition about the machine, training the belt 35 in the recesses 32 and in meshing engagement with the teeth 34 of the pulley wheels 30 of the several devices 10, and then mechanically interconnecting the belt end portions 66,68 and setting the rivet 86 as above described to form the splice 70. As will be understood, this installation process can be accomplished in a matter of only several minutes, in contrast to the over one hour or more time required to install conventional endless timing belts requiring taking down and replacement of yarn ends. The capability of repairing breaks in the drive belt 35 with similar splices 70 provides equal ease, simplicity and time savings, as well as costs reduction, in repairing the drive belt 35, as compared with the conventional grinding, gluing and bonding process of spliced repair of conventional flat belts and the conventional necessity of entirely replacing conventional grooved belts.

Furthermore, since the preparation of the belt end portions and the spliced assembly thereof are separate steps with the actual mechanical assembly being performed by hand, the preparation of belt end portions may be performed in advance at a location remote from the knitting machines on which they will ultimately be used, thereby permitting the establishment of an inventory of replacement belts so that machine downtime resulting from broken belts is negligible and substantially inconsequential.

It has also been found that the drive arrangement of the pulley member 30 and the notched belt 35 is substantially less prone to be accumulation of fibrous lint and debris on the pulley member 30. The radial teeth 34 and the belt receiving recess 32 of the pulley member 30 provide essentially no areas in or on which lint is likely to accumulate. Instead, the notches 40 in the belt 35 have been found to tend to collect any accumulating lint and carry it away from the pulley member 30. Such lint on the belt 35 is therefore easily and routinely removed by a machine attendant using compressed air jets or by automatic compressed air cleaning apparatus, without the need to stop the machine.

Figure 7:
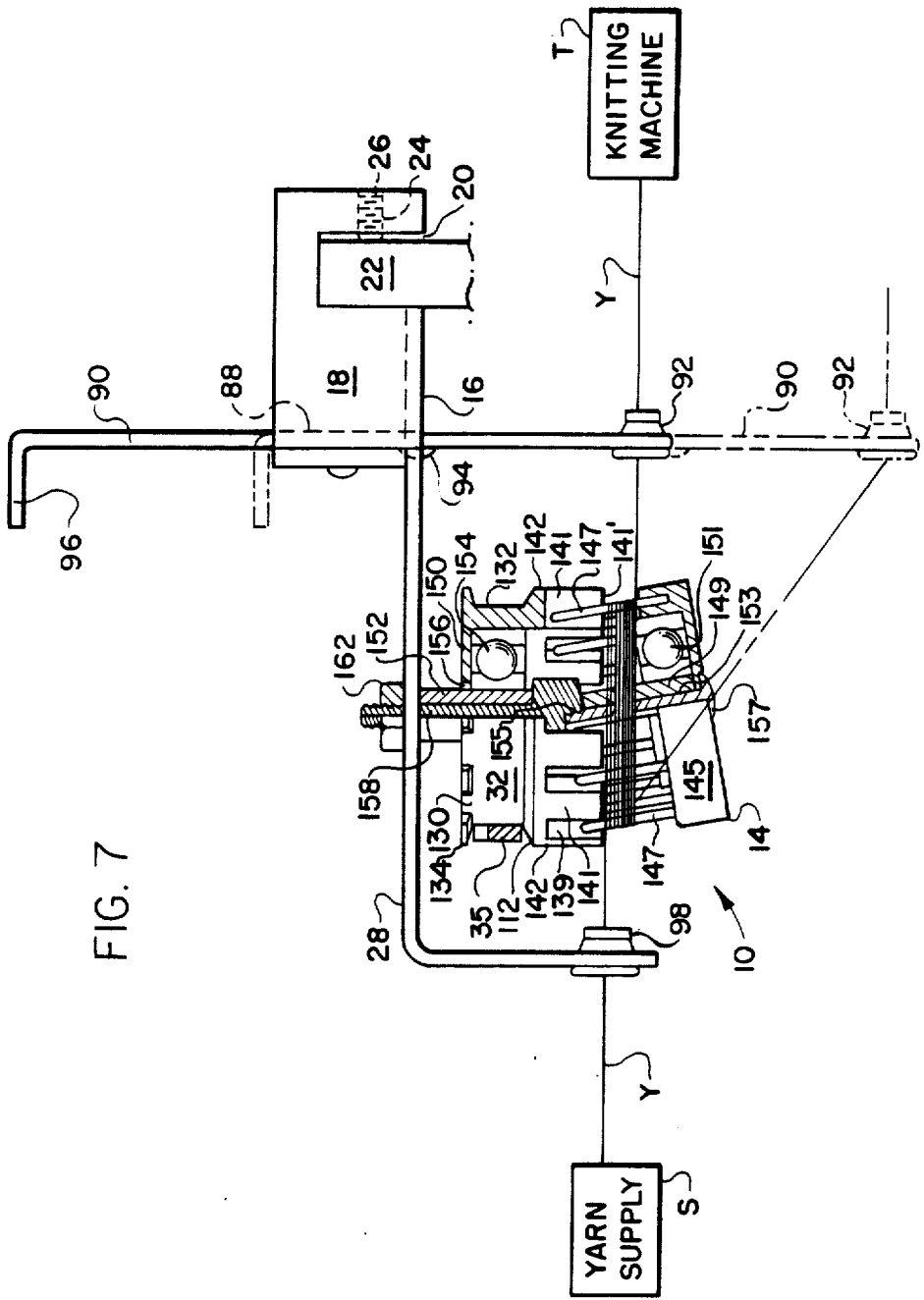
FIG. 7 is a side view of an alternate embodiment of the strand storage device of the present invention partially in side elevation and partially in axial section.

Referring now to FIG. 7, an alternate embodiment of the strand storage device of the present invention is generally indicated at 110. The strand storage device 110 utilizes the same support assembly 16, drive belt 35, and yarn guide eyelet arrangement as described above with regard to the embodiment of FIGS. 1–6, and like reference numerals are therefore utilized for these components. Essentially, the strand storage device 110 differs from the device 10 of FIGS. 1–6 in the construction and operative assocation of the pulley member 112 and storage spool member 114.

The pulley member 112 includes a circular hollow pulley wheel 130 having a circumferential peripheral recess 132 adapted to receive the driving belt 35. The pulley wheel 130 is provided with a plurality of slightly tapered teeth 134 extending radially outwardly from the axially outward side of the recess 132 at equal circumferential spacings about the wheel 130 to be adapted for meshing engagement with the notched driving belt 35 as above described, and the pulley wheel 130 has a radial end wall 150 at such end thereof at which the teeth 134 are formed. The pulley wheel 130 includes a radially enlarged cylindrical portion 142 at the opposite axially inward side of the recess 132 in which enlarged portion 142 are formed a plurality of rectangular openings 139 which extend entirely radially through the enlarged portion 142 and substantially the full axial extent thereof at equal circumferential spacings thereabout, thereby leaving a plurality of axially projecting teeth 141 in the enlarged portion 142. The end surfaces 141' of the teeth 141 are substantially flat and extend radially to the axis of the pulley wheel 130 and co-planarly with one another. The pulley wheel 130 is rotatably mounted on a tubular shaft 152 by a conventional ball bearing assembly 154 respectively affixed to the shaft 152 and fitted within the hollow interior area of the pulley wheel 130. The tubular shaft 152 extends through an opening 156 in the end wall 150 of the pulley wheel 130 and is affixed to the mounting arm 28 of the support arrangement 16 by a bolt 158 and a nut 162 in the same manner as described above with respect to the pulley wheel 30.

The spool member 14 includes a circular disc member 145 of generally the same or a slightly smaller diameter than the enlarged portion 142 of the pulley wheel 130 and includes a plurality of pins 147 corresponding in number to the openings 139 of the enlarged portion 142 of the pulley wheel 130 extending axially of the disc portion 145 in a circular arrangement adjacent its periphery concentric about its axis and circumferentially spaced from one another in correspondence with the circumferential spacings between the openings 139 of the enlarged portion 142 of the pulley wheel 130. The spool member 114 is rotatably supported on a shaft 149 by a conventional ball bearing assembly 151 respectively affixed to the shaft 149 and to the inward face of the disc member 145 radially inwardly of its pins 147.

The pulley member 112 and the spool member 114 are affixed in assembled relation with the pins 147 of the spool member 114 extending into the openings 139 of the pulley wheel 130 and thereby interdigitated with its teeth 141 by end-to-end connection of the respective shafts 152,149 of the pulley and spool members 112,114. For this purpose, an axial bore 153 is formed through the spool shaft 149 and an aligned threaded bore 155 is formed in the head of the bolt 158 by which the pulley member 130 is mounted. A threaded screw 157 extends through the bore 153 in the spool shaft 149 and is threadedly engaged in the bore 155 in the bolt 158 to rigidly retain the shafts 152,149 together. In this manner, the pulley and spool members 112,114 are independently rotatably supported but, by virtue of the interdigitated assembly of their respective teeth 141 and pins 147, are arranged for driving rotation of the spool member 114 by the pulley arrangement 112 upon its driven rotation by the driving belt 35.

For purposes which will hereinafter be more fully described, the head of the mounting bolt 158 for the pulley wheel 130 is finished substantially flat in a plane oriented angularly relative to the axis of the shaft 152, preferably at approximately seven degrees relative to a plane intersecting such axis perpendicularly, and the threaded bore 155 formed in the head is formed perpendicularly to the surface thereof to be at substantially the same angle relative to the axis. In contrast, the spool shaft 149 is finished flat in a plane perpendicular to its rotational axis. Thus, in assembly of the pulley and spool members 112,114, the respective axes thereof are oriented at approximately a seven degree angle to one another such that the pins 147 of the spool member 114 extend into the openings 139 of the pulley wheel 130 to differing extents at differing points circumferentially about the shafts 152,149. The pulley shaft 152 is affixed to the mounting arm 28 such that the angled end surface of the mounting bolt 158 is oriented at an outward incline away from the mounting block 18. In this manner, the circumferential location about the assembly of the pulley and spool members 112,114 at which the pins 147 of the spool member 114 extend to the greatest depth into the openings 139 of the pulley wheel 130 is oriented most closely adjacent the mounting block 18 and the yarn guide eyelet 92, and the diametrically opposite circumferential location about the pulley and spool members 112,114 at which the pins 147 extend into the openings 139 to the least extent is oriented at the greatest spacing from the mounting block 18 to be most closely adjacent the yarn guide eyelet 98.

In operation of the strand storage device 110, the belt 35 is driven from the machine T to effect synchronous rotation of the pulley and spool members 112,114 and resultant traveling movement of the yarn Y from the supply S. The traveling yarn Y is passed through the guide eyelet 98 and is tangentially placed onto the pins 147 of the spool member 114 in the vicinity immediately below the teeth 141 of the pulley wheel 130 at the circumferential location of the spool member 114 at which the pins 147 extend leastly into the openings 139 between the teeth 141 of the pulley wheel 130. As rotation of the pulley wheel 130 continues and in turn rotatably drives the spool member 114, the pins 147 move progressively farther into the openings 139 until reaching the circumferential location of the assembly of the pulley and spool members 112,114 adjacent the mounting block 18 at which the pins 147 extend the greatest amount into the openings 139. As this occurs, the newly applied winding of the yarn Y is engaged by the lower radial surfaces 141' of the teeth 141 of the pulley wheel 130 and is thereby displaced along the pins 147 axially away from the pulley member 112 and thereby also causes corresponding axial movement of the previous yarn winding remaining on the spool member 114. In this manner, a single layer of windings of the yarn Y is provided about the spool member 114 with the yarn Y being withdrawn through the guide eyelet 92 from the circumferential location about the spool member 114 spaced farthest axially from the pulley wheel 130.

The strand storage device 110 will be understood to provide the same advantages as the device 10 in also utilizing the improved drive arrangement of the belt 35 and the toothed pulley wheel 130 and the movable yarn withdrawal eyelet 92. The device 110 also provides a simplified construction and operative association of its pulley and storage spool members 112,114 over conventional strand storage devices in utilizing the pulley member 112 itself to act through its teeth surfaces 141' as the yarn displacement member, thereby eliminating the need for a separate displacement member as is utilized in conventional devices. The device 10 thus also requires fewer manufactured parts, less assembly time, and is less expensive than conventional devices. As with the device 10, the strand storage device 110 purposely is not provided with special electrical circuitry, yarn breakage detectors, stop motion or the like to make it more compact, simpler and further reduce its overall cost, and to enable it to be readily adapted for retrofitting to existing machines.

The present invention has been described in detail above for purposes of illustration only and is only intended to be limited by this description or otherwise to exclude any variation or equivalent arrangement that would be apparent from, or reasonably suggested by, the foregoing disclosure to the skill of the art.

I claim:

1. A device for transiently storing and delivering a traveling strand to a textile machine or the like, comprising strand storage means having a circumferential portion about and from which said strand may be wound and unwound, and means for timed positive driving rotation of said strand storage means, said driving means including pulley means operatively associated with said strand storage means for driving rotation thereof and belt means for training about a portion of said pulley means for driving rotation thereof, said pulley means including an annular belt engaging surface and a plurality of radially extending teeth equally spaced circumferentially about said pulley means adjacent only one side of said belt engaging surface, and said belt means including a plurality of notches formed along only one edge thereof at equal spacings corresponding to said radial teeth and shaped to compatibly mesh with said radial teeth, said belt means being nonendless and having two opposite end portions and a splice fixing said two end portions to one another with the respective notches to each said end portion in register with one another.

2. A strand storing and delivering device according to claim 1 and characterized further in that said splice includes an opening in one belt end portion centrally of the transverse dimension thereof, a slit in said one belt end portion extending longitudinally from said central opening away from said one belt end portion, and transversely opposed openings in opposite transverse side edges of the other belt end portion, said belt ends being mechanically interconnected with said other belt end portion inserted through said slit and central opening of said one belt end portion and with the transverse extent of said other belt end portion between its side edge openings transversely within said central opening.

3. A strand storing and delivering device according to claim 2 and characterized further in that each said notch has spaced endmost and end facing sides which extend substantially perpendicularly to the length of said belt means and which define said notch between said sides; said transversely opposed openings being located in said opposite transverse side edges of said other belt end portion directly transversely adjacent one said notch therein, one said transverse opening being formed at said one notch for deepening it and the other said transverse openings being formed directly adjacently in the opposite unnotched edge of said other belt end portion, each said transverse opening having a straight side located most closely adjacent the terminal end edge of said other belt end portion in substantial alignment with said endmost side of said one notch; and said central opening being located in said one belt end portion generally longitudinally intermediate two successive notches therein, said central opening having a straight side substantially perpendicular to the length of said belt means located most closely adjacent the terminal end edge of said one belt end portion and more closely adjacent thereto than the end facing side of the endmost one of said successive notches by a dimension substantially equal to the thickness of said belt means, whereby said one notch and said endmost successive notch are in register with one another in said splice.

4. A strand storing and delivering according to claim 2, and characterized further in that said belt means includes means supplementally affixing said one belt end portion at a location longitudinally outwardly from said central opening to said other belt end portion at a location longitudinally inwardly from said side edge openings.

5. A strand storing and delivering device according to claim 4 and characterized further in that said supplementally affixing means comprises a rivet.

6. A strand storing and delivering device according to claim 2 and characterized further by first guide means arranged adjacent a strand receiving region of said circumferential portion of said strand storage means for feeding said strand generally tangentially thereto and second guide means arranged adjacent a strand withdrawal region of said circumferential portion of said strand storage means for withdrawing said strand generally tangentially therefrom, said second guide means being slidably movable generally axially relative to said strand storage means between a position radially adjacent said strand withdrawal region for controlling withdrawal of said strand from said strand storage means at substantially the same traveling speed as said strand is fed thereto and a position spaced from said strand storage means at the axial end thereof most closely adjacent said strand withdrawal region for withdrawal of said strand from said strand storage means at a rate independently of the traveling speed of said strand.

7. A strand storing and delivering device according to claim 6 and characterized further in that said circumferential portion is of a decreasing dimension radially from an enlarged strand receiving region adapted for winding application of said strand onto said circumferential porton to a reduced strand withdrawal region adapted for unwinding removal thereat of said strand from said circumferential portion, said decreasing dimension of said circumferential portion being effective to cause windings of said strand thereabout to be deflected and to progressively migrate from said strand receiving region to said strand withdrawal region upon rotation of said strand storage means.

8. A strand storing and delivering device according to claim 2 and characterized further in that said circumferential portion is of a decreasing dimension radially from an enlarged strand receiving region adapted for winding application of said strand onto said circumferential portion to a reduced strand withdrawal region adapted for unwinding removal thereat of said strand from said circumferential portion, said decreasing dimension of said circumferential portion being effective to cause windings of said strand thereabout to be deflected and to progressively migrate from said strand receiving region to said strand withdrawal region upon rotation of said strand storage means.

9. A strand storing and delivering device according to claim 1 and characterized further by first guide means arranged adjacent a strand receiving region of said circumferential portion of said strand storage means for feeding said strand generally tangentially thereto and second guide means arranged adjacent a strand withdrawal region of said circumferential portion of said strand storage means for withdrawing said strand generally tangentially therefrom.

10. A strand storing and delivering device according to claim 9 and characterized further in that said second guide means is slidably movable generally axially relative to said strand storage means between a position radially adjacent said strand withdrawal region for controlling withdrawal of said strand from said strand storage means at substantially the same traveling speed as said strand is fed thereto and a position spaced from said strand storage means at the axially end thereof most closely adjacent said strand withdrawal region for withdrawal of said strand from said strand storage means at a rate independently of the traveling speed of said strand.

11. A strand storing and delivering device according to claim 1 and characterized further in that said circumferential portion is of a decreasing dimension radially from an enlarged strand receiving region adapted for winding application of said strand onto said circumferential portion to a reduced strand withdrawal region adapted for unwinding removal thereat of said strand from said circumferential portion, said decreasing dimension of said circumferential portion being effective to cause windings of said strand thereabout to be deflected and to progressively migrate from said strand receiving region to said strand withdrawal region upon rotation of said strand storage means.

12. A strand storing and delivering device according to claim 11 and characterized further in that said strand storage means comprises spool means having a continuous generally smooth circular annular periphery forming said circumferential portion.

13. Apparatus for timed positive driving rotation of a textile yarn storage and delivering device or like device or apparatus, comprising pulley means for operative connection to said device for driving rotation thereof and belt means for training about a portion of said pulley means for driving rotation thereof upon longitudinal traveling movement of said belt means, said pulley means including an annular belt engaging surface for receiving said belt means and a plurality of radially extending teeth equally spaced circumferentially about said pulley means adjacent only one side of said belt engaging surface, and said belt means having a plurality of notches formed along only one edge thereof at equal spacings corresponding to said radial teeth and shaped to compatibly mesh with said radial teeth, said belt means being non-endless and having two opposite end portions and a splice mechanically interconnecting said two end portions with one another with the respective notches at each said end portion in register with one another.

14. Apparatus according to claim 13 and characterized further in that said splice includes an opening in one belt end portion centrally of the transverse dimension thereof, a slit in said one belt end portion extending longitudinally from said central opening away from said one belt end portion, and transversely opposed openings in opposite transverse side edges of the other belt end portion, said belt ends being mechanically interconnected with said other belt end portion inserted through said slit and said central opening of said one belt end portion and with the transverse extent of said other belt end portion between its side edge openings transversely within said central opening.

15. Apparatus according to claim 14 and characterized further in that each said notch has spaced endmost and end facing sides which extend substantially perpendicularly to the length of said belt means and which define said notch between said sides; said transversely opposed openings being located in said opposite transverse side edges of said other belt end portion directly transversely adjacent one said notch therein, one said transverse opening being formed at said one notch for deepening it and the other said transverse openings being formed directly adjacently in the opposite unnotched edge of said other belt end portion, each said transverse opening having a straight side located most closely adjacent the terminal end edge of said other belt end portion in substantial alignment with said endmost side of said one notch; and said central opening being located in said one belt end portion generally longitudinally intermediate two successive notches therein, said central opening having a straight side substantially perpendicular to the length of said belt means located most closely adjacent the terminal end edge of said one belt end portion and more closely adjacent thereto than the end facing side of the endmost one of said successively notches by a dimension substantially equal to the thickness of said belt means, whereby said one notch and said endmost successive notch are in register with one another in said splice.

16. Apparatus according to claim 15 and characterized further in that said belt means includes rivet means for affixing said one belt end portion at a location longitudinally outwardly from said central opening to said other belt end portion at a location longitudinally inwardly from said side edge openings.

17. A device for transiently storing and delivering a traveling strand to a textile machine or the like, comprising pulley means having spaced circumferentially thereabout a plurality of generally radial engaging surfaces and a plurality of generally axial openings intermediate said radial engaging surfaces, and strand storage means having a circumferential portion about and from which said strand may be wound and unwound and plural axial projections spaced circumferentially thereabout, said pulley means and said strand storage means being rotatably mounted independently of one another with said projections of said strand storage means extending respectively into said openings of said pulley means for meshing engagement therewith for driving of said strand storage means by said pulley means upon its rotation and with the respective axes of said pulley means and said strand storage means at a relatively small angle to one another for engagement of windings of said strand on said strand storage means in the vicinity of said pulley means by said radial engaging surfaces to displace said strand windings axially away from said pulley means.

18. A strand storing and delivering device according to claim 17 and characterized further in that said pulley means comprises a pulley wheel adapted for driven rotation and plural teeth extending axially from said pulley wheel in a circular arrangement spaced circumferentially from one another concentrically about the axis of said pulley wheel, said radial engaging surfaces being formed by the projecting ends of said teeth.

19. A strand storing and delivering device according to claim 18 and characterized further in that said strand storage means comprises spool means having a plurality of axially extending pins in a circular arrangement spaced circumferentially from one another concentrically about the axis of said spool means forming said circumferential portion and said projections.

20. A strand storing and delivering device according to claim 19 and characterized further in that the axes of said pulley wheel and said spool means are arranged at an angle relative to one another of approximately seven degrees (7°).

21. A strand storing and delivering device according to claim 19 and characterized further in that said pulley means includes an annular belt engaging surface and a plurality of radially extending teeth equally spaced circumferentially about said pulley means adjacent only one side of said belt engaging surface, and characterized further by belt means operatively trained about a portion of said belt engaging surface of said pulley means for driving rotation thereof, said belt means including a plurality of notches formed along only one edge thereof at equal spacings corresponding to said radial teeth and shaped to compatibly mesh with said radial teeth, said belt means having two end portions and a splice mechanically interconnecting said two end portions to one another with the respective notches at each said end portion in register with one another.

22. A strand storing and delivering device according to claim 21 and characterized further by first guide means arranged adjacent a strand receiving region of said circumferential portion of said strand storage means for feeding of said strand generally tangentially thereto and second guide means arranged adjacent a strand withdrawal region of said circumferential portion of said strand storage means for withdrawing said strand generally tangentially therefrom, said second guide means being slidably movable generally axially relative to said strand storage means between a position radially adjacent said strand withdrawal region for controlling withdrawal of said strand from said strand storage means at substantially the same traveling speed as said strand is fed thereto and a position spaced from said strand storage means at the axial end thereof most closely adjacent said strand withdrawal region for withdrawal of said strand from said strand storage means at a rate independently of the traveling speed of said strand.

23. A strand storing and delivering device according to claim 17 and characterized further in that said strand storage means comprises spool means having a plurality of axially extending pins in a circular arrangement spaced circumferentially from one another concentrically about the axis of said spool means forming said circumferential portion and said projections.

24. A strand storing and delivering device according to claim 17 and characterized further in that said pulley means includes an annular belt engaging surface and a plurality of radially extending teeth equally spaced circumferentially about said pulley means adjacent only one side of said belt engaging surface, and characterized further by belt means operatively trained about a portion of said belt engaging surface of said pulley means for driving rotation thereof, said belt means including a plurality of notches formed along only one edge thereof at equal spacings corresponding to said radial teeth and shaped to compatibly mesh with said radial teeth, said belt means having two end portions and a splice mechanically interconnecting said two end portions to one another with the respective notches at each said end portion in register with one another.

25. A strand storing and delivering device according to claim 17 and characterized further by first guide means arranged adjacent a strand receiving region of said circumferential portion of said strand storage means for feeding said strand generally tangentially thereto and second guide means arranged adjacent a strand withdrawal region of said circumferential portion of said strand storage means for withdrawing said strand generally tangentially therefrom, said second guide means being slidably movable generally axially relative to said strand storage means between a position radially adjacent said strand withdrawal region for controlling withdrawal of said strand from said strand storage means at substantially the same traveling speed as said strand is fed thereto and a position spaced from said strand storage means at the axial end thereof most closely adjacent said strand withdrawal region for withdrawal of said strand from said strand storage means at a rate independently of the traveling speed of said strand.

* * * * *

UNITED STATES PATENT OFFICE
CERTIFICATE OF CORRECTION

Patent No. 4,632,324        Dated December 30, 1986

Inventor(s) Alan Gutschmit

It is certified that error appears in the above-identified patent and that said Letters Patent are hereby corrected as shown below:

Col. 3, Line 59, delete "reduced" and insert therefor — rendered — .
Col. 3, Line 67, delete "maybe" and insert therefor — may be — .
Col. 5, Line 3, insert at the beginning before "a" the word — and — .
Col. 7, Line 58, delete "58", and insert therefor — 56 — .
Col. 8, Line 9, delete "and" and insert therefor — end — .
Col. 10, Line 17, between "belt" and "portion" insert — end — .
Col. 10, Line 20, delete "86" and insert therefor — 68 — .
Col. 10, Line 30, delete "68'" and insert therefor — 66' — .
Col. 13, Line 64, delete "be" and insert therefor — the — .
Col. 17, Line 28, between "delivering" and "according" insert — device — .
Col. 18, Line 33, delete "axially" and insert therefor — axial — .
Col. 19, Line 43, delete "successively" and insert therefor — successive — .
Abstract, Line 4, delete "noval" and insert therefor — novel — .

Signed and Sealed this

Fourteenth Day of June, 1988

Attest:

DONALD J. QUIGG

*Attesting Officer*        *Commissioner of Patents and Trademarks*